United States Patent [19]

Thompson

[11] Patent Number: 5,186,262
[45] Date of Patent: Feb. 16, 1993

[54] POWERED TOOL APPARATUS
[75] Inventor: Owen R. Thompson, Louisville, Ky.
[73] Assignee: Caterpillar Inc., Peoria, Ill.
[21] Appl. No.: 785,374
[22] Filed: Oct. 30, 1991
[51] Int. Cl.$^5$ .............................................. B25B 23/14
[52] U.S. Cl. ..................... 173/182; 173/165; 173/218; 29/822; 81/470
[58] Field of Search ............... 173/165, 218, 166, 178, 173/176, 181, 182; 81/57.22, 470; 29/822

[56] References Cited
U.S. PATENT DOCUMENTS

| Re. 29,444 | 10/1977 | Alexander | 173/12 |
|---|---|---|---|
| 3,576,217 | 4/1971 | Schaedler | 173/218 |
| 3,827,506 | 8/1974 | Himmelstein et al. | 173/182 |
| 3,955,662 | 5/1976 | Thackston | 192/150 |
| 4,091,451 | 5/1978 | Weiner et al. | 173/182 |
| 4,106,570 | 8/1978 | Eshghy et al. | 173/12 |
| 4,167,058 | 9/1979 | Janssen | 29/822 |
| 4,223,555 | 9/1980 | Alexander | 73/139 |
| 4,286,458 | 9/1981 | Alexander | 73/862.21 |
| 4,403,663 | 9/1983 | Janssen | 173/12 |
| 4,535,850 | 8/1985 | Alexander | 173/12 |
| 4,938,109 | 7/1990 | Torres et al. | 81/467 |
| 5,005,654 | 4/1991 | Moriki et al. | 173/12 |
| 5,067,567 | 11/1991 | Webster | 173/165 |

Primary Examiner—Frank T. Yost
Assistant Examiner—Scott A. Smith
Attorney, Agent, or Firm—Claude F. White

[57] ABSTRACT

An electro-hydraulically operated tool apparatus installs and removes bolts of track shoes for assembling and disassembling endless track assemblies. In the assembly procedure, a wrench of the tool apparatus engages the head portion of a track shoe bolt and rotates the bolt in a clockwise direction at a relatively high speed to thread a nut onto the bolt and secure the track shoe to the track chain. The tool apparatus senses the torque and at a pre-set level, a transmission of the apparatus automatically shifts to rotate the wrench at a relatively low speed. At this point, the tool apparatus starts measuring the angle of rotation, and at a pre-determined angle of about 120°, the wrench stops rotating. The rotation of the bolt an additional 120° after the pretorque level is reached applies the desired torque value to the bolted joint. In the disassembly procedure, the wrench engages the head portion of the bolt and applies a large down pressure to the bolt. The wrench then rotates the bolt in a counterclockwise direction at low speed and high torque. When the torque value drops, the transmission automatically shifts to high speed to rapidly remove the bolt.

12 Claims, 7 Drawing Sheets

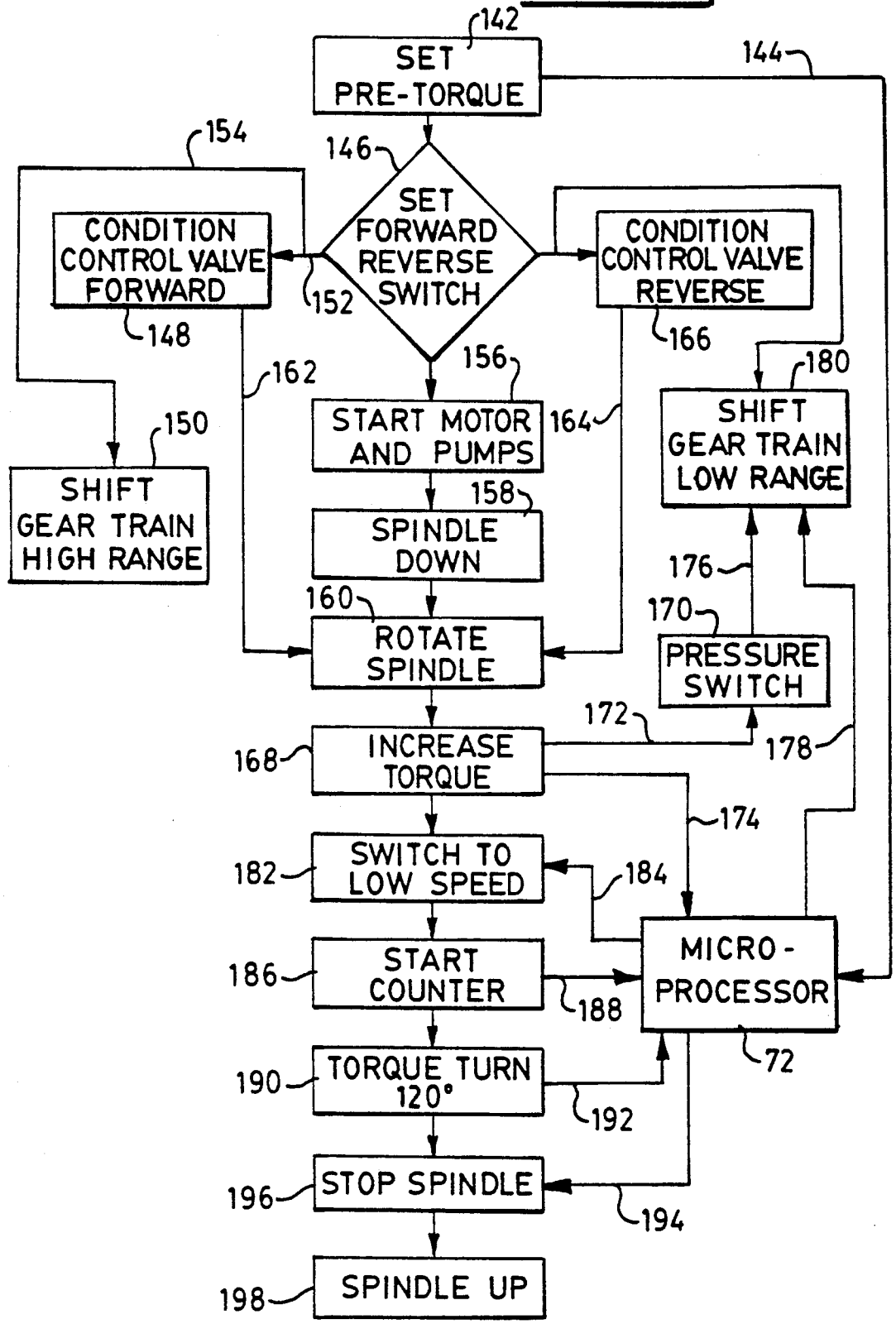

POWERED TOOL APPARATUS

DESCRIPTION

1. Technical Field

This invention relates generally to a tool apparatus and more particularly to a powered tool apparatus which is useful in servicing track assemblies by installing and removing bolts which secure track shoes to track chains.

2. Background Art

Assembling and disassembling of endless track assemblies is a difficult, time consuming, and noisy operation, generally requiring two or more service personnel to perform the task. Some type of air or hydraulically powered impact wrench is generally used to tighten and loosen the threaded fasteners which secure the track shoes and chains together. These wrenches are large and difficult to manipulate and generate considerable noise. Operators, and service personnel nearby, are generally required to wear ear protection. As the track assemblies increase in size, larger wrenches are required, which magnifies the above noted problems.

One type of apparatus for mounting and removing shoe bolts which secure shoes to a track chain is disclosed in U.S. Pat. No. 5,005,654, issued Apr. 9, 1991, to Y. Moriki et al. In this patent, two separate hydraulic motors are used to power the drive shaft. One motor is for low speed, high torque and the other is for high speed, low torque. The high speed low torque motor is connected to the drive shaft by pulleys and belts. The maximum or pre-torque applied to the bolted joint is determined by a relief valve. Operation of the Moriki apparatus is substantially manual and would require at least two people to complete the installation or removal of bolts.

Another type of wrench apparatus is disclosed in U.S. Pat. No. 4,403,663, issued Sep. 13, 1983, to H. W. Jannsen. In this patent, the drive shaft is driven by a pair of overriding clutches and additional torque is applied by a cylinder and yoke arrangement. The entire mechanism is raised and lowered by a hand-driven threaded nut. This is a rather cumbersome tool apparatus and would, as in the above noted patent, require at least two people to operate.

The present invention is directed to overcoming one or more of the problems as set forth above.

DISCLOSURE OF THE INVENTION

In one aspect of the present invention, a powered tool apparatus for installing and removing track shoe bolts includes a frame structure, a hydraulic pump and an electric motor supported on the frame structure, and a movable head structure pivotably connected to the frame structure. The movable head structure includes a spindle shaft, a gear train having multiple gear ranges, a hydraulic motor, and means for shifting the gear train between the gear ranges. The tool apparatus further includes means for controlling the rotational speed and the direction of rotation of the spindle shaft and means for detecting the torque value applied to the spindle shaft. The tool apparatus also controls the final angle of turn of the spindle shaft after the shaft reaches a pre-torque value.

Track-type vehicles are supported and propelled by endless track assemblies including track chains and replaceable track shoes which are secured to the chains by a plurality of threaded bolts and nuts. It is very important that the track shoes be securely held to the track chain. To this end, the bolts and nuts are tightened to a recommended torque value. This is generally accomplished using an air powered impact wrench. As the size of the vehicles, track shoes, and bolts increase, the task of securing the shoes with the bolts becomes more difficult, as does the job of accurately tightening the bolts to a recommended torque value. The actual final bolt torque value is often dependent upon the skill and experience of the impact wrench operator. Another problem is the removal of bolts with badly worn head portions. Often, the impact wrench cannot loosen these bolts and a cutting torch is used to remove them, which can damage the track shoes or chain.

The subject powered tool apparatus quickly and accurately installs and removes bolts which secure track shoes to track chains. The subject tool apparatus automatically tightens bolts using the torque turn method. This is the most effective method of properly tightening bolts of all sizes. The bolt is tightened to a pre-set torque value and then turned an additional turn angle. The accuracy and repeatability of the tool apparatus are not dependent upon the skill or experience of the tool operator, and bolts with badly worn head portions can easily be removed without damaging the shoes or chain.

BRIEF DESCRIPTION OF THE DRAWINGS

FIG. 7 is a diagrammatic flow chart of the sequence of operations of the present invention.

BEST MODE FOR CARRYING OUT THE INVENTION

Figure 1:
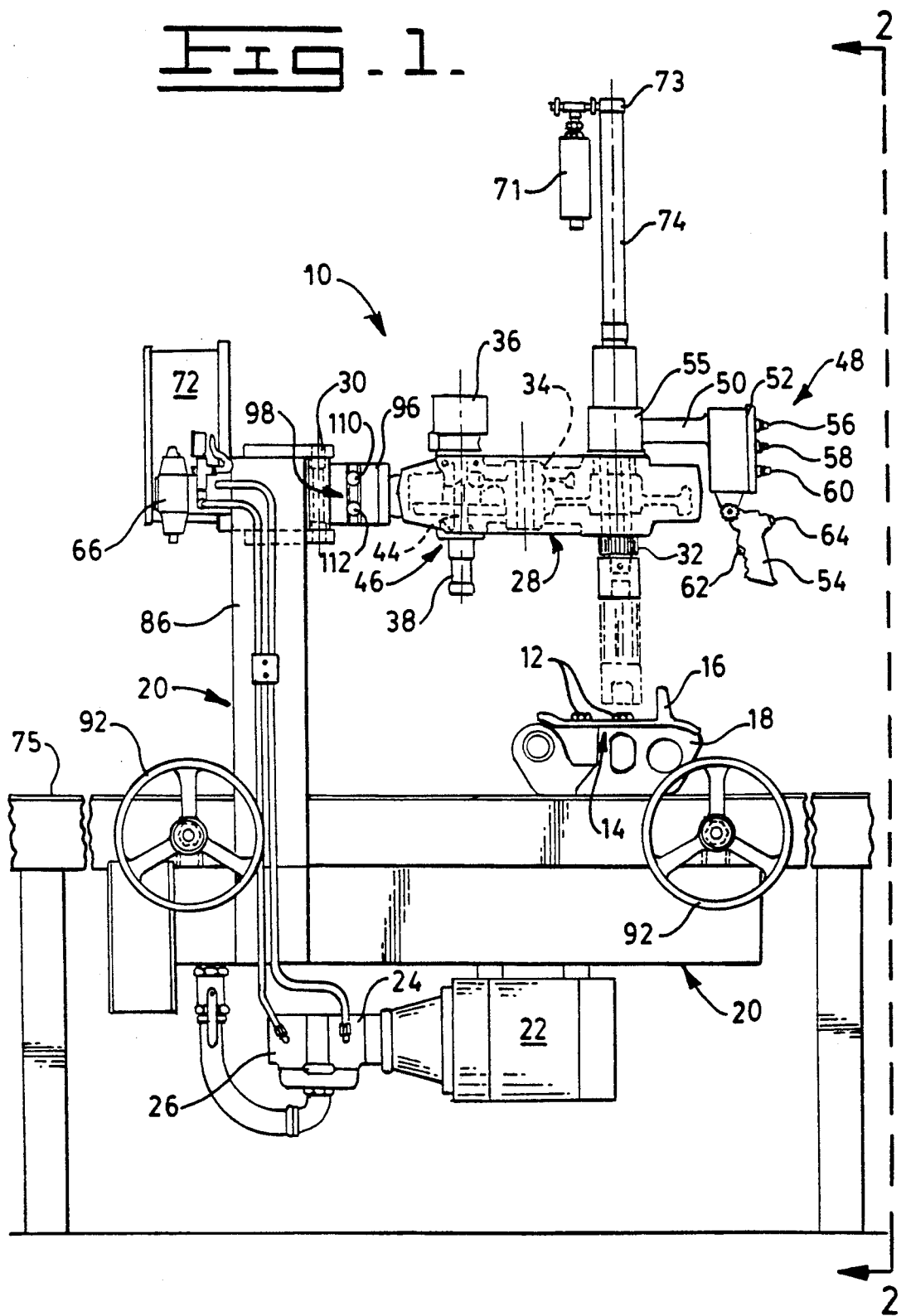
FIG. 1 is a diagrammatic side elevational view of the powered tool apparatus of the present invention.
Figure 2:
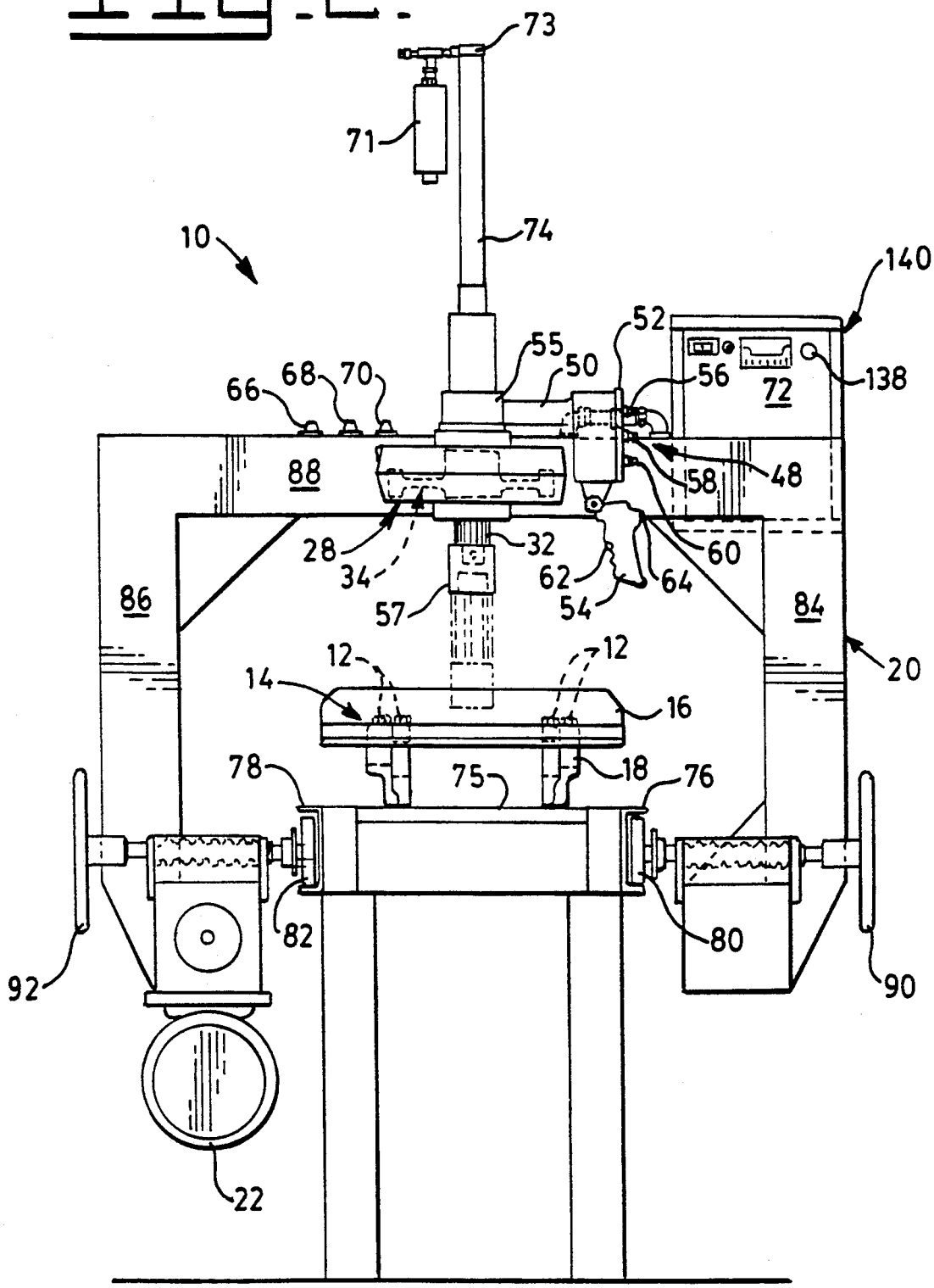
FIG. 2 is a diagrammatic front elevational view of the tool apparatus shown in FIG. 1 and taken generally along the lines 2—2 of FIG. 1.

With reference to the drawings, a powered tool apparatus 10 for installing and removing bolts 12 of a bolted joint 14 between track shoes 16 and a track chain 18 includes a frame structure 20, an electric motor 22 and first and second hydraulic pump 24,26 supported on the frame structure 20, and a movable head structure 28 pivotably connected at a pivot joint 30 to the frame structure 20. The first and second hydraulic pumps 24,26 are connected to and powered by the electric motor 22. The movable head structure 28 includes a rotatable spindle shaft 32, a gear train 34 coupled to the spindle shaft 32, a hydraulic motor 36, and a hydraulically actuatable shifting cylinder 38. The gear train 34 has first and second gear ranges 40,42 which are connected to and powered by the hydraulic motor 36. An axially movable shifter gear 44 is coupled to the shifting cylinder 38, and together, they serve as a means 46 for shifting the gear train 34 between the first and second gear ranges 40,42. The hydraulic motor 36 is adapted to be powered by the first and second pump 24,26 and the shifting cylinder 38 is adapted to be powered by the second pump 26.

The powered tool apparatus 10 further includes a means 48 for controlling the rotational speed and the direction of rotation of the spindle shaft 32. The means 48 includes a pivotably movable control arm 50 having a control panel portion 52 and a pistol grip portion 54. The control arm 50 is connected to the head structure 28 through a sleeve 55 and is pivotably movable relative to the head structure 28 between a plurality of control positions. The control arm 50 also serves to pivotably move the head structure 28 about the pivot joint 30 to properly position the spindle shaft 32 above the bolts 12. The lower portion of the spindle shaft 32 is adapted to receive various sizes of socket tools 57, sized to fit the particular size of bolts 12. The control panel portion 52 includes several control switches, such as a forward and reverse selector switch 56, a start-stop switch 58, and a high-torque switch 60. The pistol grip portion 54 includes additional control switches, such as a hydraulic motor actuating switch 62 and a spindle raise and lower switch 64. The various control switches 56,58,60,62,64 are connected to a plurality of control valves 66,68,70 through a programmable microprocessor 72 for programmed control of the various machine functions.

A hydraulically powered spindle actuating cylinder 74 is supported on the head structure 28 and is coupled to the rotatable spindle shaft 32. The second hydraulic pump 26 is adapted to supply power to the cylinder 74 for axially moving the spindle shaft 32 relative to the head structure 28 in a direction which is substantially perpendicular to the plane of rotation of the gear train 34. An accumulator 71 and a flow control valve 73 are mounted on the spindle actuating cylinder 74 and provide low pressure power to the cylinder 74 to lower the spindle shaft 32 and position the socket tool 57 onto a bolt 12 with very little down pressure. This protects the bolts 12 and nuts which may have only a few threads engaged. This allows the socket tool 57 to line up and drop down into engagement with the bolt 12 without impacting the entire tool apparatus 10.

The track shoes 16 and track chain 18 are preferably supported on a conveyor or table 75, which includes first and second guide channels 76,78. The frame structure 20 includes a plurality of support rollers 80,82, first and second upright beam portions 84,86, and a bridge portion 88 which connects the first and second upright beam portions 84,86. The support rollers 80,82 are adapted to fit within the respective guide channels 76,78 for supporting the frame structure on the table 75, with the upright beam portions and the bridge portion straddling the table 75. The support rollers 80,82, which are connected to respective control wheels 90,92, provide means for moving the powered tool apparatus 10 relative to the table 75. The head structure 28 is preferably connected to the bridge portion 88 through a torque link 96 and the pivot joint 30.

The torque link 96 is one portion of a means 98 for detecting the torque value applied to the spindle shaft 32 and for actuating the shifting means 46 in response to the detecting means 98 sensing a pre-determined torque value. In addition to the torque link 90, the detecting means 98 includes a plurality of strain sensing gages 100,102 connected to the torque link 96, and the programmable microprocessor 72, with the strain gages 100,102 in communication with the microprocessor 72. The shifting cylinder 38 is automatically actuatable by the microprocessor 72 in response to a pre-determined torque value being sensed by the strain sensing gages 100,102. The gear train 34 is therefore automatically shifted between first and second gear ranges 38,40 in response to a pre-set and pre-determined torque value being applied to the spindle shaft 32 and/or the head structure 28.

Figure 3:
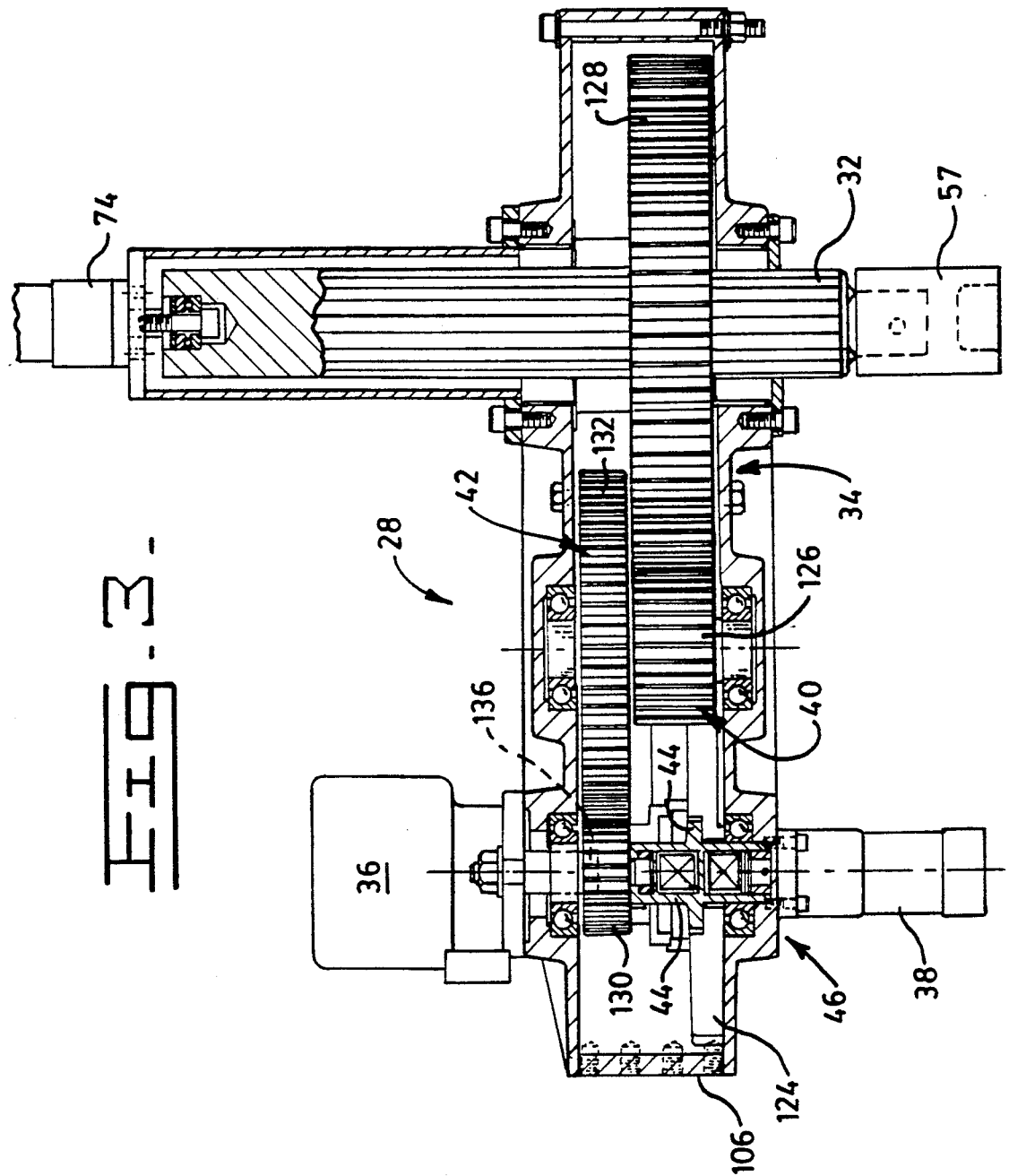
FIG. 3 is a diagrammatic sectional view, on an enlarged scale of the gear train and spindle of the present invention.
Figure 4:
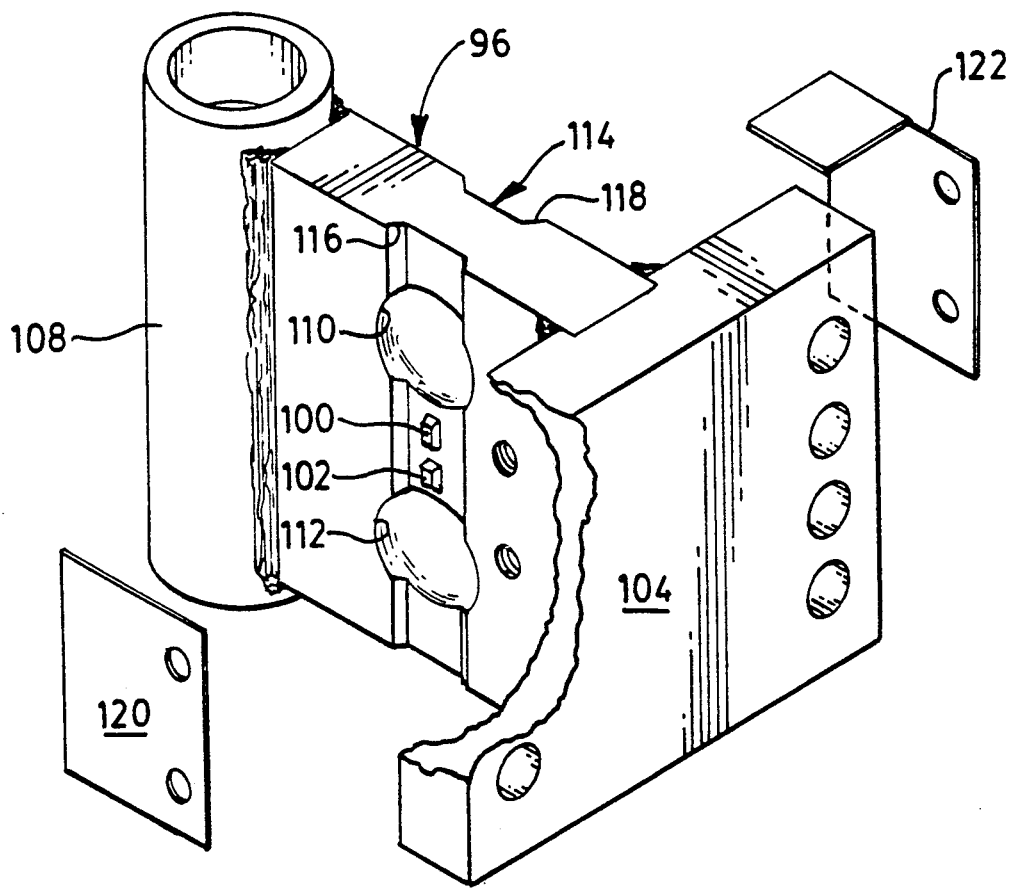
FIG. 4 is a diagrammatic perspective view, on an enlarged scale, of the torque link of the present invention.

With particular reference to FIGS. 3 and 4, the torque link 96 has a flat mount plate portion 104 which is adapted to mate with a similar mounting portion 106 on the head structure 28. The torque link 96 further has a cylindrical mounting portion 108 which mounts to the frame structure 20 at the pivot joint 30. In order to make the torque link 96 more sensitive to torque loads being applied to the link 96, a pair of through holes 110,112 are provided in the central area 114 of the link 96. Additionally, a pair of grooves 116,118 are provided in the central area 114. Preferably, the strain gages 100,102 are mounted to the torque ink 96 in the central area 114 between the holes 110,112, where the link 96 is most sensitive to movement. Cover plates 120,122 are provided to protect the strain gages 100,102.

Figure 5:
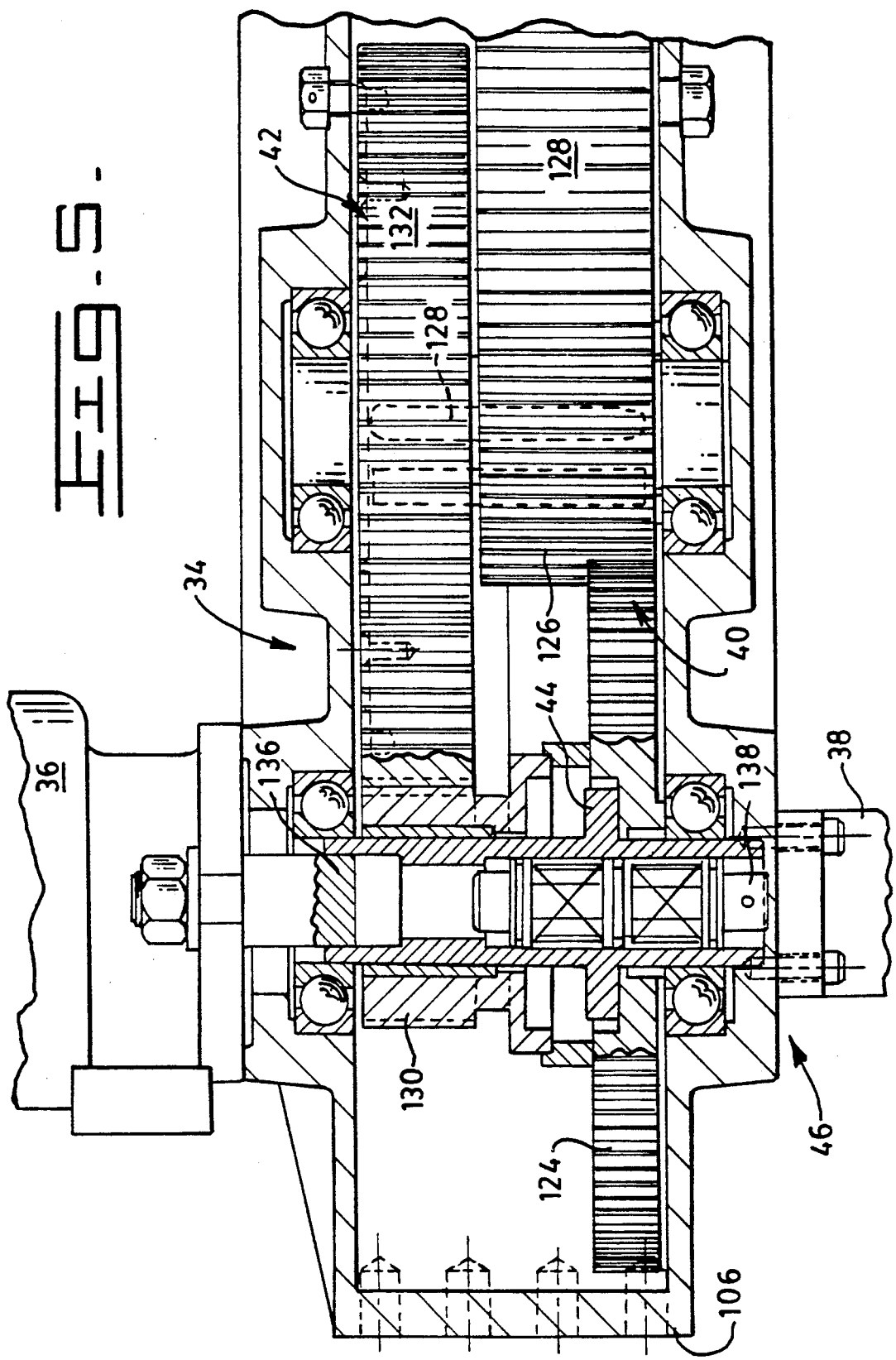
FIG. 5 is a diagrammatic enlarged sectional view of a portion of the gear train shown in FIG. 3.
Figure 6:
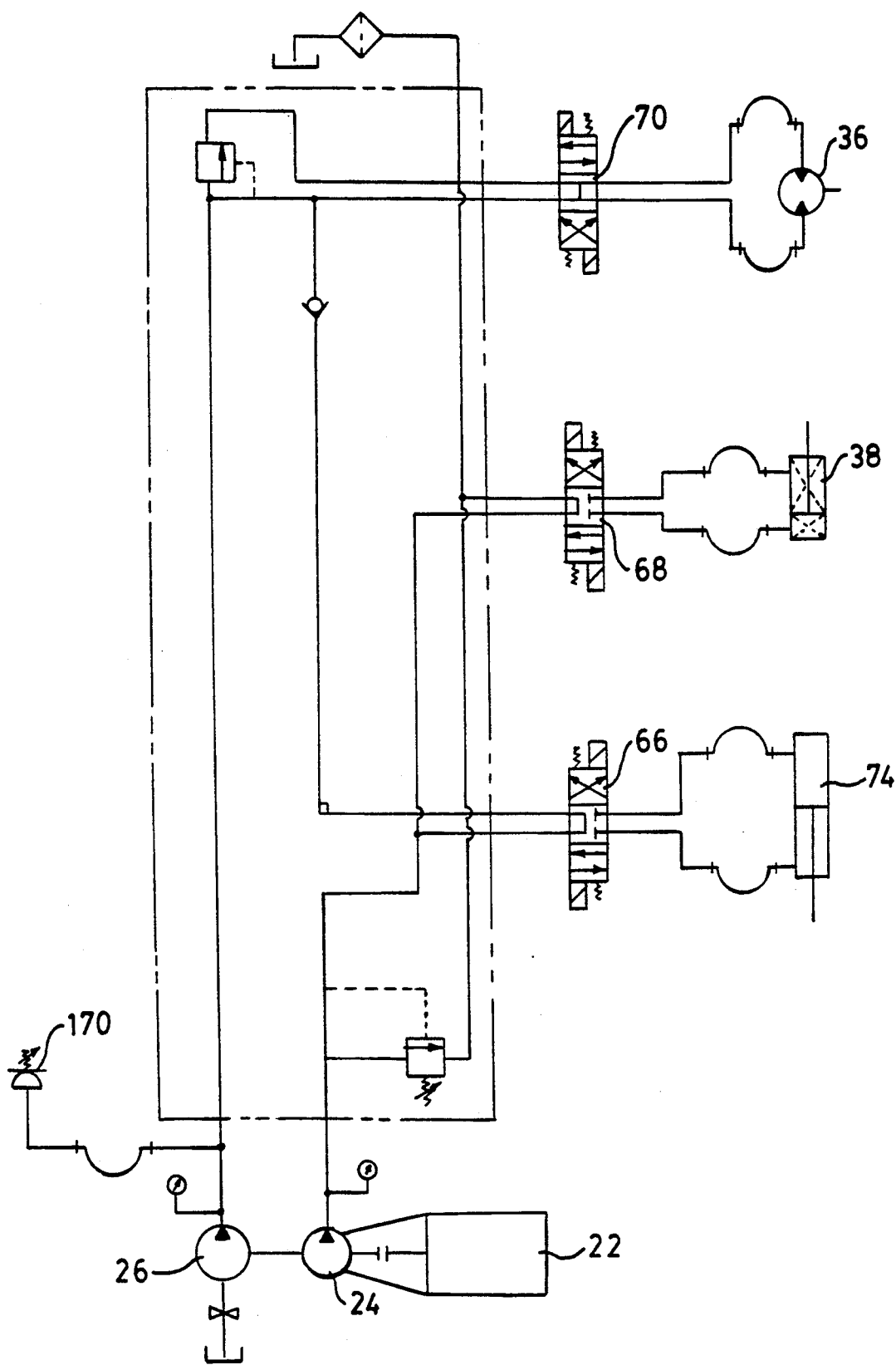
FIG. 6 is a diagrammatic hydraulic schematic of the present invention.

With particular reference to FIGS. 3 and 5, the first gear range 40 of the gear train 34 includes first, second and third gears 124,126,128 with the first gear 124 adapted to be driven by the shifter gear 44, and the third gear drivingly coupled to the spindle shaft 32. The second gear 126 is in mesh with both the first and third gears 124,128. The second gear range 42 includes fourth and fifth gears 130,132 and second and third gears 126,128. The fourth gear 130 is adapted to be driven by the shifter gear 44 and is in mesh with the fifth gear 132. The second gear 126 and the fifth gear 132 are keyed together by a key 134. The motor 36 has a shaft 136 which is coupled to the shifter gear 44. The shifting cylinder 38 has a shaft 138 which is in contact with the shifter gear 44, such that actuation of the shifting cylinder 38 moves the shifter gear 44 between connection with the first gear range 40 and the second gear range 42.

With particular reference to FIG. 7, a sequence of operations of the subject tool apparatus 10 is illustrated in flow chart form. To begin a bolt installation operation, the desired pre-torque is set by a dial 138 on a control panel portion 140 of the microprocessor 72. This is represented by a box 142 in the flow chart. Setting the pre-torque also conditions the microprocessor 72 as represented by a line 144. The forward-reverse switch 56 is then set to forward which conditions the control valve 70 for forward rotation and shifts the shifting gear 44 to high range. This is represented by the boxes 146,148, and 150, and the lines 152 and 154. The main power switch 58 is now activated and the spindle lower switch 64 is pressed to lower the spindle shaft 32. These operations are represented by the respective boxes 156 and 158. The spindle shaft 32 is then rotated by operating the switch 62, represented by the box 160. The lines 162 and 164 represent forward or reverse rotation of the spindle shaft 32 by the control valve 70, represented by the boxes 148 and 166.

As the torque increases, represented by the box 168, signals are sent to a pressure switch 170 and the microprocessor 72 by the lines 172 and 174. The lines 176 and 178 connect the respective pressure switch box 170 and the microprocessor box 72 to the low range gear train box 180 such that the gear train 34 can be shifted to low range by a signal from the pressure switch 170 or the microprocessor 72. The switch to low speed, represented by the box 182, is controlled by the microprocessor, such switch being represented by the line 184. The box 186 indicates the start of a counter within the gear train 34 with the counting being sent to the microprocessor 72 by the line 188. The torque turn, which is a turn of the spindle 32 through 120 degrees after the pre-torque is reached, is represented by the box 190, with the line 192 representing the signal of the torque turn going to the microprocessor 72. When the 120 degrees of the torque turn is reached, the microprocessor 72 signals the spindle 32 to stop, represented by the lines 194 and the box 196. The bolt installation is now complete and the spindle is raised by operation of the switch 66, such operation being represented by the box 198. The lines 200 and 202 represent conditioning the control valve 70 and the gear train 34 for operation of the spindle shaft 32 in a reverse or counter-clockwise direction, for a bolt removal operation.

INDUSTRIAL APPLICABILITY

With reference to the drawings, the subject powered tool apparatus 10 is particularly suited for installing and removing bolts 12 of bolted joints 14 between a plurality of track shoes 16 and a track chain 18. For an installation procedure, the operator places the bolts 12 through the shoes 16 and the chain 18 and starts the nuts on the bolts by hand or with a small air gun. The proper size socket tool 57 is placed on the spindle shaft 32 and the head structure is manipulated by hand until the spindle shaft is substantially in line with a particular bolt 12. The operator then dials in the proper torque setting on the microprocessor controller 72 for the size of bolts 12 being used and switches the forward-reverse switch 36 to forward. The main power start-stop switch 58 is now activated and the spindle lower switch 64 is pressed to lower the spindle shaft 32 and the socket tool 57 onto the bolt 12. The operator now presses the hydraulic motor actuating switch 62 to start the motor 36 rotating at high speed in a forward or clockwise direction. Previous activation of the forward switch 56 has activated the shifting cylinder 38 to move the shifter gear 44 into engagement with the first, or high speed, gear range 40. The bolt 12 is quickly tightened and the torque value applied to the spindle shaft 32, the head structure 28, and the torque link 96 increases.

The strain gages 100,102 detect the torque value and when this value reaches the pre-set level, or the torque value reaches about 300 foot pounds, the strain gages 100,102 send a signal to the microprocessor 72. This signal is then relayed to the control valve 68, which activates the shifting cylinder 38 and shifts the gear train 34 into the second, or low speed, gear range 42. As the spindle shaft 32 begins to rotate at low speed, an optical or magnetic counter is activated to start counting pulses, with each pulse being equivalent to one degree of rotation. When the counter has counted 120 pulses, or 120 degrees of rotation, the microprocessor 72 signals the control valve 70 to de-activate the motor 36, and the control valve 68 to de-activate the shifting cylinder 38. At the same time, the shifter gear 44 is moved to a neutral or dis-engaged position within the gear train 34. The additional rotation of the bolt 12 through 120 degrees after pre-torque is reached provides the recommender torque tightening value for the bolts 12. The assembly procedure is then repeated for each one of the bolts 12.

For a dis-assembly, or bolt 12 removal, procedure, the operator switches the forward-reverse switch 56 to reverse and activates the main power start-stop switch 58. The spindle lower switch 64 is engaged to lower the spindle shaft 32 and the socket tool 57 onto the bolt 12. Previous activation of the reverse switch 56 has activated the shifting cylinder 38 to move the shifter gear 44 into engagement with the second, of low speed, gear range 42. The operator now presses the hydraulic motor actuation switch 62 to start the motor 36 rotating at low speed and high torque in a reverse or counter-clockwise direction. This low speed, high torque, mode will, in most cases, smoothly break the bolt 12 loose. If the head of the bolt 12 should be badly worn, additional pressure on the socket tool 57 may be necessary. This can be provided by the operator holding down on the spindle lower switch 64, which will exert about 1800 pounds of down pressure on the bolt 12.

Once the bolt 12 breaks loose, the torque value decreases and the microprocessor signals the control valve 68 to move the shifter gear 44 out of engagement with the low speed, second gear range 42 and into engagement with the high speed, first gear range 40. This automatic switching between low and high speed can be overridden by the operator activating the high-torque switch 60. Such a procedure might be necessary to remove an especially tight fitting bolt 12. De-activating the high-torque switch 60 will put the unit back into high speed, and the bolt 12 will be quickly removed. The bolt removal procedure is then repeated for the remainder of the bolts 12. The entire tool apparatus 10 is easily manipulated from side to side or forward and backward by the control arm 50 and the control wheels 90-92. Since the control arm 50 is pivotable about the head structure 28, it can be used from either side of the tool apparatus 10, in any number of positions, and with either the left or right hand of the operator.

Other aspects, objects, and advantages of this invention can be obtained from a study of the drawings, the disclosure, and the appended claims.

I claim:

1. A powered tool apparatus for installing and removing bolts of a bolted joint between track shoes and a track chain, said tool apparatus comprising:
    a frame structure;
    means for moving said frame structure relative to a preselected location;
    a first hydraulic pump supported by said frame structure;
    an electric motor supported on said frame structure, said motor being adapted to drive said first hydraulic pump;
    a pivot joint;
    a movable head structure pivotably connected to said frame structure at said pivot joint, said head structure including a rotatable spindle shaft, a gear train having first and second gear ranges and being coupled to said spindle shaft, said gear train being adapted to rotate in a horizontal plane, a single hydraulic motor adapted to be powered by said first hydraulic pump and being connected to said gear train, and means for shifting said gear train between said first and second ranges, said spindle shaft being axially movable relative to said head structure and said gear train;
    means for controlling the rotational speed and direction of rotation of said spindle shaft; and
    means for detecting the torque value applied to said spindle shaft and actuating said shifting means in response to said detecting means sensing a predetermined torque value.

2. A powered tool apparatus, as set forth in claim 1, wherein said means for shifting said gear train between said first and second ranges includes an axially movable shift gear and a hydraulically actuatable shifting cylinder coupled to said shifter gear.

3. A powered tool apparatus, as set forth in claim 2, including a torque link connected between said frame structure and said movable head structure, a programmable microprocessor, and a strain sensing gage connected to said torque link and in communication with said microprocessor, said shifting cylinder being automatically actuatable by said microprocessor in response to a pre-determined torque value being sensed by said strain sensing gage.

4. A powered tool apparatus, as set forth in claim 1, wherein said rotatable spindle shaft is axially movable in a direction which is substantially perpendicular to the plane of rotation of said gear train, and said means for controlling the rotational speed and direction of said spindle shaft includes a forward and reverse selector switch and a switch for actuating said hydraulic motor.

5. A powered tool apparatus, as set forth in claim 4, including a pivotably movable control arm connected to said head structure and being pivotably moveable relative to said head structure between a plurality of control positions.

6. A powered tool apparatus, as set forth in claim 5, wherein said forward and reverse selector switch and said hydraulic motor actuating switch are housing in said control arm.

7. A powered tool apparatus, as set forth in claim 5, wherein said movable head structure is pivotally movable about said pivot joint by said control arm.

8. A powered tool apparatus, as set forth in claim 1, wherein said means for detecting said torque value includes a torque link connected between said frame structure and said movable head structure, a programmable microprocessor, and a strain sensing gage connected to said torque link and in communication with said microprocessor, said torque link having a reduced section central area with said strain sensing gage being connected to said reduced section central area.

9. A powered tool apparatus, as set forth in claim 1, including a hydraulically powered spindle actuating cylinder supported on said movable head structure and coupled directly to said rotatable spindle shaft, said cylinder being in axial alignment with said spindle shaft and adapted to move said spindle shaft in directions toward and away from said preselected location.

10. A powered tool apparatus, as set forth in claim 9, including a second hydraulic pump being supported by said frame structure, said second pump adapted to supply hydraulic power to said spindle actuating cylinder, said shifter cylinder, and said hydraulic motor.

11. A powered tool apparatus, as set forth in claim 1, wherein said frame structure includes a plurality of support rollers, first and second upright beam portions and a bridge portion connected to said upright beam portions, said support rollers adapted to support said frame structure and move said frame structure relative to said preselected location.

12. A powered tool apparatus, as set forth in claim 1, wherein said frame structure includes first and second upright beam portions and a bridge portion connected to said upright beam portions, said movable head structure being connected to said bridge portion, said upright beam portions and said bridge portion straddling said preselected location.

* * * * *